United States Patent

Schipper

[11] 4,348,290
[45] Sep. 7, 1982

[54] METHOD AND DEVICE FOR REMOVING A FLUID FROM A MIXTURE OF A FLUID AND A SOLID SUBSTANCE

[75] Inventor: Hendricus H. Schipper, Bunnik, Netherlands

[73] Assignee: B.V. Machinefabriek v/h Pannevis & Zn., Netherlands

[21] Appl. No.: 270,425

[22] Filed: Jun. 4, 1981

[30] Foreign Application Priority Data

Jun. 25, 1980 [NL] Netherlands ................... 8003667

[51] Int. Cl.$^3$ .............................................. B01D 33/00
[52] U.S. Cl. ..................................... 210/783; 210/350; 210/400; 100/118
[58] Field of Search .............. 210/783, 160, 350, 386, 210/400, 401, 236; 100/118, 121

[56] References Cited

U.S. PATENT DOCUMENTS

| | | | |
|---|---|---|---|
| 3,459,122 | 8/1969 | Pastoors | 210/386 |
| 4,066,548 | 1/1978 | Olson | 210/400 |
| 4,127,487 | 11/1978 | Havalda | 210/783 |
| 4,144,807 | 3/1979 | Bastgen | 210/400 |
| 4,172,416 | 10/1979 | Hakansson | 210/401 |
| 4,186,090 | 1/1980 | Oosten | 210/783 |

FOREIGN PATENT DOCUMENTS

7407831 12/1974 Netherlands ................... 210/783

*Primary Examiner*—Ernest G. Therkorn
*Attorney, Agent, or Firm*—Biebel, French & Nauman

[57] ABSTRACT

The invention is relating to a method of removing fluid from a mixture of fluid and solid substance, in which the mixture is guided with the aid of a conveyor belt along the outer circumference of a drum which is surrounded at least over part of its circumference by the conveyor belt, whereby the conveyor belt is positively driven in order to obtain the intended displacement thereof, while the drum is braked as well as to a device for carrying out the method of aforementioned comprising a drum and a belt extending along part of the drum, the relative dispositions of the drum and the belt being such that the mixture can be carried along between the belt and the drum, which are each or both previous to fluid, whereby the device comprises furthermore means for driving the belt and means for braking the drum.

10 Claims, 1 Drawing Figure

U.S. Patent  Sep. 7, 1982  4,348,290
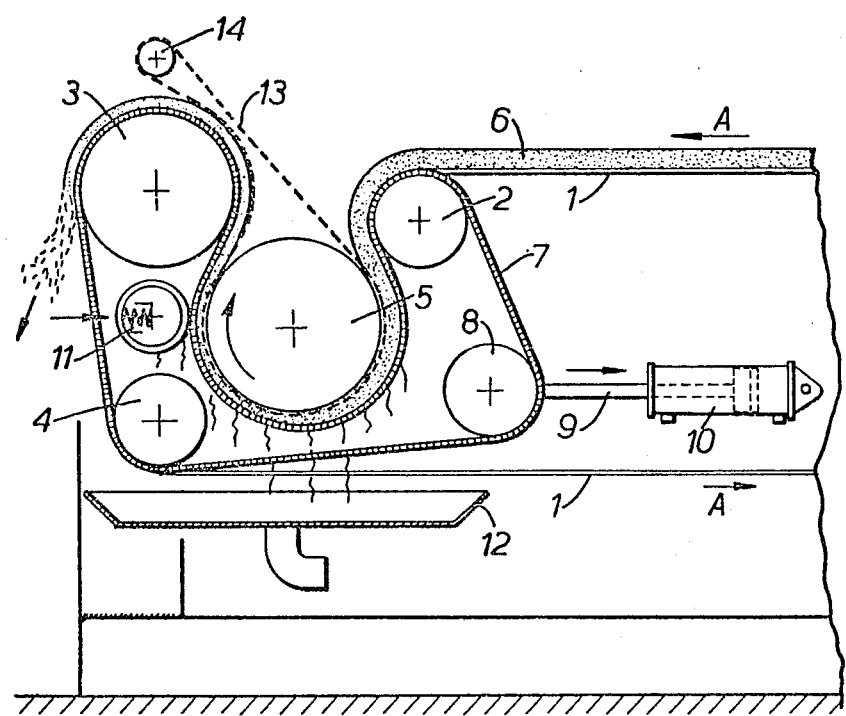

METHOD AND DEVICE FOR REMOVING A FLUID FROM A MIXTURE OF A FLUID AND A SOLID SUBSTANCE

The invention relates to a method of removing a fluid from a mixture of a fluid and a solid substance, in which the mixture is guided with the aid of a conveyor belt along the outer circumference of a drum, which is surrounded by the conveyor belt over at least part of its circumference.

For removing fluid from a mixture of fluid and solid substance many methods have been proposed, but frequently the separation between fluid and solid substance is not satisfying so that after the treatment the solid substance still contains a comparatively large amount of fluid. Moreover, known methods and devices for separating solid substances and fluids are often excessively complicated and expensive for obtaining the desired separation between fluid and soild substance in an ecomically acceptable manner.

The invention has for its object to provide a method by which the aforesaid disadvantages can be mitigated.

According to the invention this can be achieved by a positive drive of the conveyor belt for the intended displacement thereof, whilst the drum is braked.

In this method the pressure exerted on the mixture can be gradually increased from the area where the mixture is introduced between the drum and the belt towards the area where the mixture emerges from between the drum and the belt in a simple manner so that the fluid can be satisfactorily pressed out of the mixture across the pervious belt and/or through the pervious drum. Moreover, the forces produced between the drum surface and the belt provoke a disturbance of the location of the solid constituents in the layer between the drum and the belt, which effectively contributes to the removal of the fluid from the mixture.

Preferably near the point, where the conveyor belt leaves the drum, an additional pressure is exerted on the conveyor belt in the direction towards the drum so that the relatively small amount of fluid still remaining in the mixture can be pressed out of the mixture by said additional final pressure.

For carrying out said method it is efficient to use a device comprising a drum and a conveyor belt extending along part of the drum, the relative dispositions of the drum and the conveyor belt being such that the mixture can be displaced between the belt and the drum, one or both of which are pervious to the fluid, said device comprising furthermore means for driving the belt and means for braking the drum. Such a device may have a relatively simple construction, whilst the displacements of the conveyor belt and the drum can be readily checked.

The invention will be described more fully hereinafter with reference to an embodiment of a device according to the invention schematically illustrated in the accompanying FIGURE.

The device shown in the FIGURE comprises an endless conveyor belt 1, which in the embodiment shown is pervious to fluid so that this conveyor belt 1 additionally operates as a filter belt. The conveyor belt 1 is guided inter alia along three guide rollers 2, 3 and 4, whilst it is furthermore passed between the guide rollers 2 and 3 beneath a drum 5.

The upper run of the belt 1 preferably extends above a plurality of trays (not shown in the FIGURE) provided with sieves, in which vacuum may be produced, if desired, so that from a cake 6 of the mixture of fluid and solid substance above said trays a first removal of the fluid can be performed by a draining effect.

At the level of the path where the conveyor belt 1 passes around the drum 5 the conveyor belt 1 is preferably supported by one or more belts 7 located on after the other as viewed in the FIGURE and being in contact with the side of the filter belt remote from the cake 6 carried by the filter belt and being guided with the filter belt 1 around the guide rollers 2, 3 and 4 and around the drum and furthermore guided on a guide roller 8 connected with the piston rod 9 of a hydraulic ram 10. It will be obvious that with the aid of the hydraulic ram 10 the belt(s) 7 can be stretched to a greater or lesser extent by the displacement of the guide roller 8.

It is furthermore shown that near the area where the conveyor belt or filter belt 1 is guided in a direction away from the drum 5 a pressing roller 11 is arranged, which is forced against the side of the conveyor belt 1 or of the belt(s) 7 respectively remote from the drum 5.

Beneath the drum 5 a collecting trough 12 is arranged for collecting the fluid squeezed out of the cake 6.

The device may furthermore be provided with an auxiliary belt 13, which is in contact with the outer circumference of the drum 5 and which is passed in the manner shown along a further guide roller 14 located above the guide roller 3. This auxiliary belt 13, which is used for guiding and supporting the cake lying on the filter belt 1, may, however, be omitted and/or be replaced by other guide means for the cake.

The device comprises driving means (not shown) for driving the conveyor belt 1, for example, driving means coupled with the guide roller 3. The device is furthermore provided with braking members (not shown) coupled with the drum 5 for braking or stopping the rotation of the drum 5 in an adjustable manner.

During operation the conveyor belt 1 will be driven in the direction of the arrow A so that the cake 6 lying on it is carried along through the gap between the conveyor belt 1 and the drum 5 rotatable about its centre line. The drum 5 tends to move with the belt 1, but such a rotation of the drum 5 is braked to an extent such that at the circumference of the drum 5 shear forces are imparted to the cake 6.

Thus an advantageous pressure distribution is generated in the cake pressed with the aid of the belt(s) 7 against the circumference of the drum 5, that is to say, a relatively low pressure at the area, where the cake gets in between the belt 1 and the drum, whilst said pressure gradually increases to a high value at the area where the belt is again guided in a direction away from the drum 5.

The low pressure on the inlet side prevents the material of the cake from being pressed away laterally or rearwardly. According as during the displacement of the cake around the rotary axis of the drum 5 more fluid is squeezed out of the cake, the material is stiffened so that at the increase in pressure on this material it will not be pressed away.

Just before the belt 1 is guided in a direction away from the drum, an additional high pressure is exerted on the material located between the belt 1 and the drum 5 with the aid of the pressing roller 11. The major portion of the removable fluid is squeezed out of the cake 6 before said point and the very high pressure transiently exerted will squeeze the comparatively small remainder of removable fluid from the cake.

The magnitude of the pressure $S_1$ exerted at the point where the cake 6 is introduced into the nip between the belt 1 and the drum 5 and the magnitude of the pressure $S_2$ exerted near the end of the trajectory covered by the cake enclosed between the tray and the drum 5 depend upon the stress in the belts 1 and 7, leaving the effect obtained by the pressing roller 11 out of consideration, and in order to ensure a satisfactory removal of the fluid it is necessary for this pressure to increase sufficiently during the passage of the cake along this pressing trajectory. The increase in stress depends on the braking moment exerted on the drum 5, whilst this stress is limited by the frictional forces produced between the belt 1, the material of the cake 6 and the drum.

Even if the braking moment exerted on the drum 5 is chosen to be so high that during operation the drum 5 stands still and only the belt 1 and part of the cake located between the belt and the drum continue moving, the ratio $S_2/S_1$ can never exceed $_e f\alpha$, wherein $f$=internal friction coefficient of the cake or (if lower) the friction coefficient between the cake and the drum and $\alpha$=the enclosed angle.

Practical measurements have shown that $f$ usually varies between 0.19 and 0.43. If, for example, $\alpha=150°$ varies, then $S_2/S_1$ lies at the most between 1.64 and 3.1. In practice it will usually be necessary for the belt 1 to surround the drum 5 through an angle of at least 90°, and it will usually be preferred for the belt to surround the drum through an angle of more than 150°.

I claim:

1. In a method of removing fluid from a mixture of fluid and solid substance wherein said mixture is supported by a conveyor belt, then passed between said belt and at least a portion of an outer circumference of a drum wherein said belt has sufficient tension to compress said mixture against said outer circumference such that said drum is rotated by contact with said mixture, the improvement comprising the steps of:
   positively driving said conveyor belt about said drum; and
   braking said drum to resist movement of said mixture therepast, thereby creating shear stresses in said mixture and continuously increasing compressive forces of said conveyor belt against said outer circumference of said drum from a point where said mixture first contacts said circumference to a point where said mixture breaks contact with said circumference.

2. A method as claimed in claim 1 characterized in that the conveyor belt is passed along the drum circumference through an angle of at least 90°, preferably through an angle of more than 150°.

3. A method as claimed in claim 1 or 2 in which a fluid-pervious conveyor belt is employed, characterized in that the belt, before it is guided around the drum, is passed with the mixture lying on it along a path, where at least part of the fluid flows out of the mixture by draining.

4. A method as claimed in claim 1 characterized in that near the area where the conveyor belt leaves the drum an additional pressure is exerted on the conveyor belt in the direction towards the drum.

5. An apparatus for removing fluid from a mixture of fluid and solid substance of the type in which an endless belt is entrained about at least a portion of an outer circumference of a drum, said belt having sufficient tension to compress a mixture between said belt and said drum such that a mixture so compressed is dewatered thereby, the improvement comprising:
   means for positively driving said belt about said drum; and
   said drum being mounted for rotation by movement of said belt therepast, and including means for braking said drum relative to movement of said belt such that shear stresses are created in a mixture compressed between said belt and said drum, and compressive forces between said belt and said drum continuously increase from a point of first contact of a mixture on said belt with said outer circumference to a point of separation of a mixture on said belt from said outer circumference.

6. A device as claimed in claim 5 characterized in that the conveyor belt is supported on the side remote from the drum by one or more adjacent belts, which can be stretched by a stretching device.

7. A device as claimed in claim 5 or 6 characterized in that guide rollers are provided for the conveyor belt in a manner such that the conveyor belt surrounds the drum through an angle of more than 90°.

8. A device as claimed in claim 5 characterized in that near the area where the conveyor belt is guided in a direction away from the drum a pressing roller is arranged for urging the belt in the direction towards the drum.

9. A device as claimed in claim 5 further comprising:
   a second endless belt entrained about said outer periphery of said drum and overlying and contacting at least a portion of said endless belt; and
   means for tensioning said second endless belt, thereby urging said second belt to compress said belt against said outer circumference such that a mixture between said belt and said circumference is compressed and dewatered.

10. A device as claimed in claim 9 wherein said positive driving means comprising means for positively driving said second endless belt.

* * * * *